2,800,136

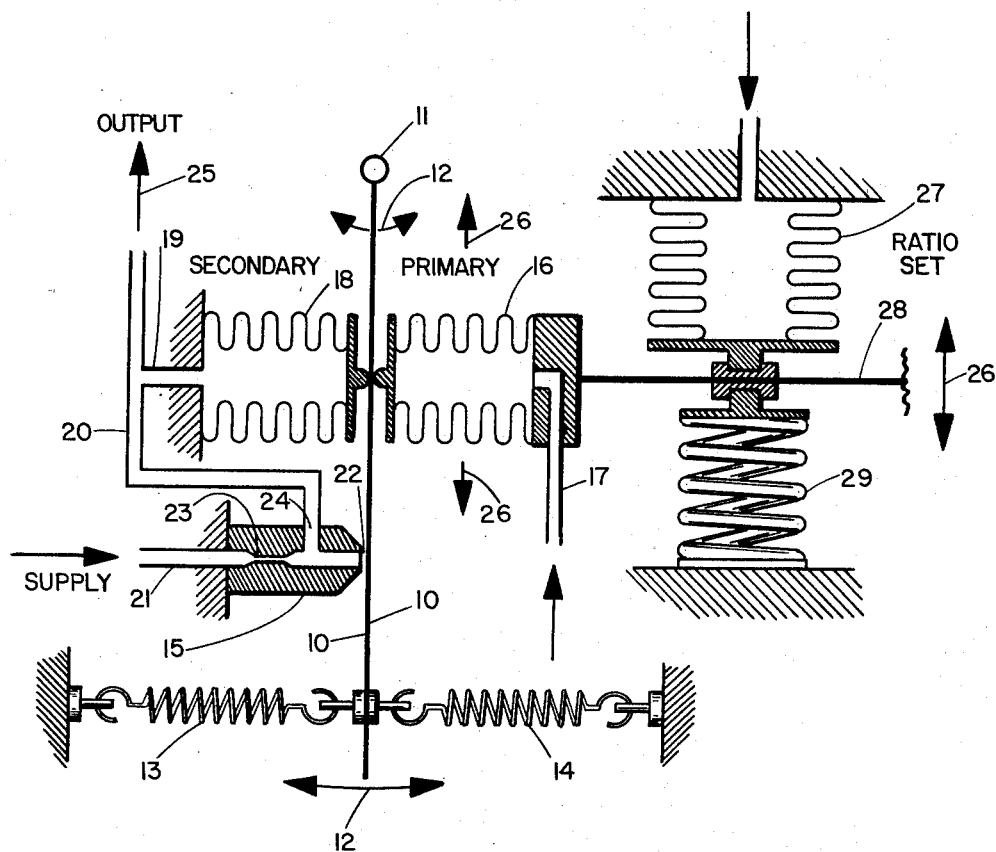
FIG. I

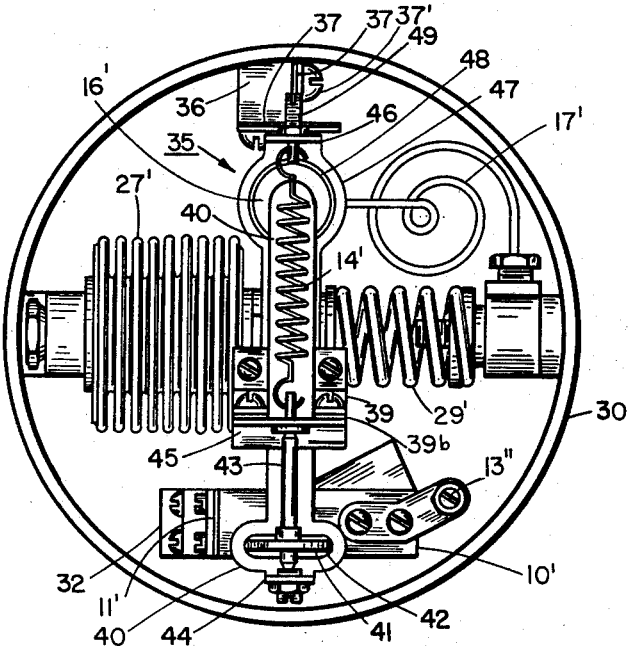
FIG. II
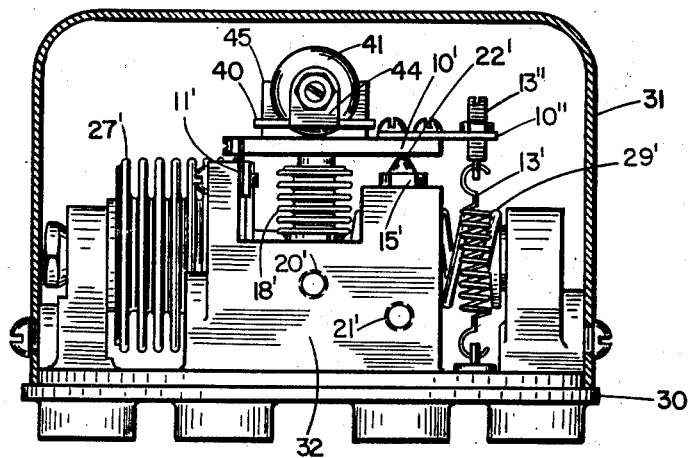
FIG. III
INVENTOR.
HOEL L. BOWDITCH

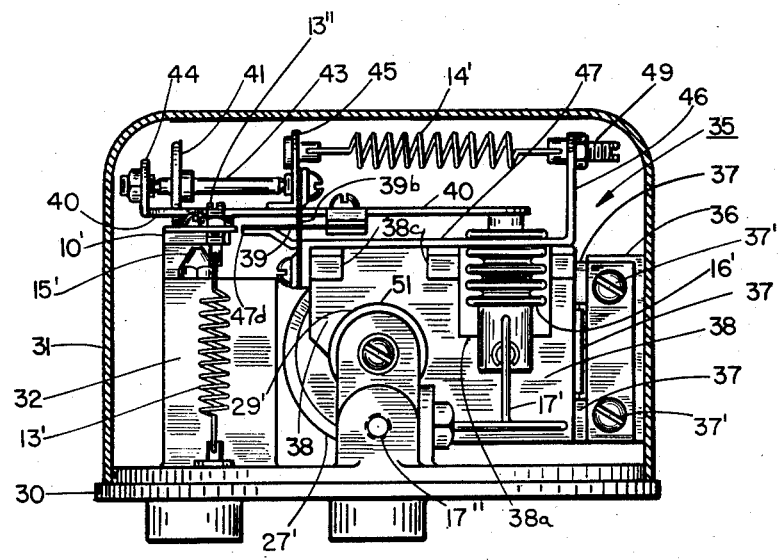
FIG. IV
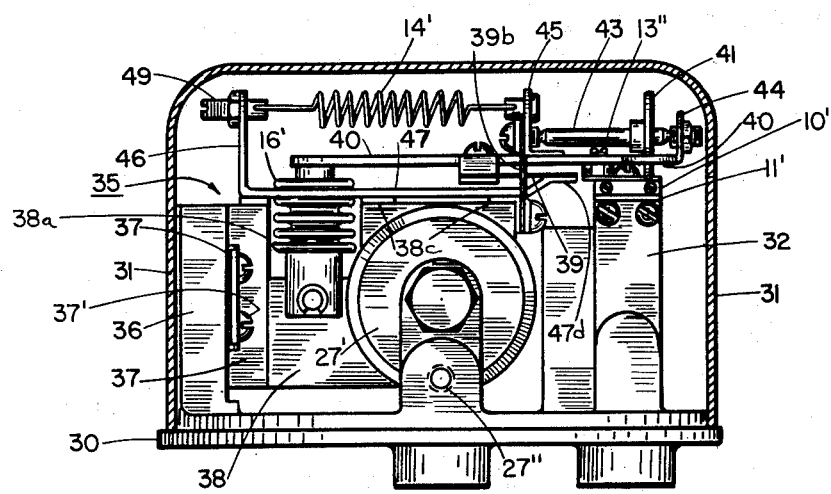
FIG. V
INVENTOR.
HOEL L. BOWDITCH
BY
Curtis, Morris + Safford
ATTORNEYS

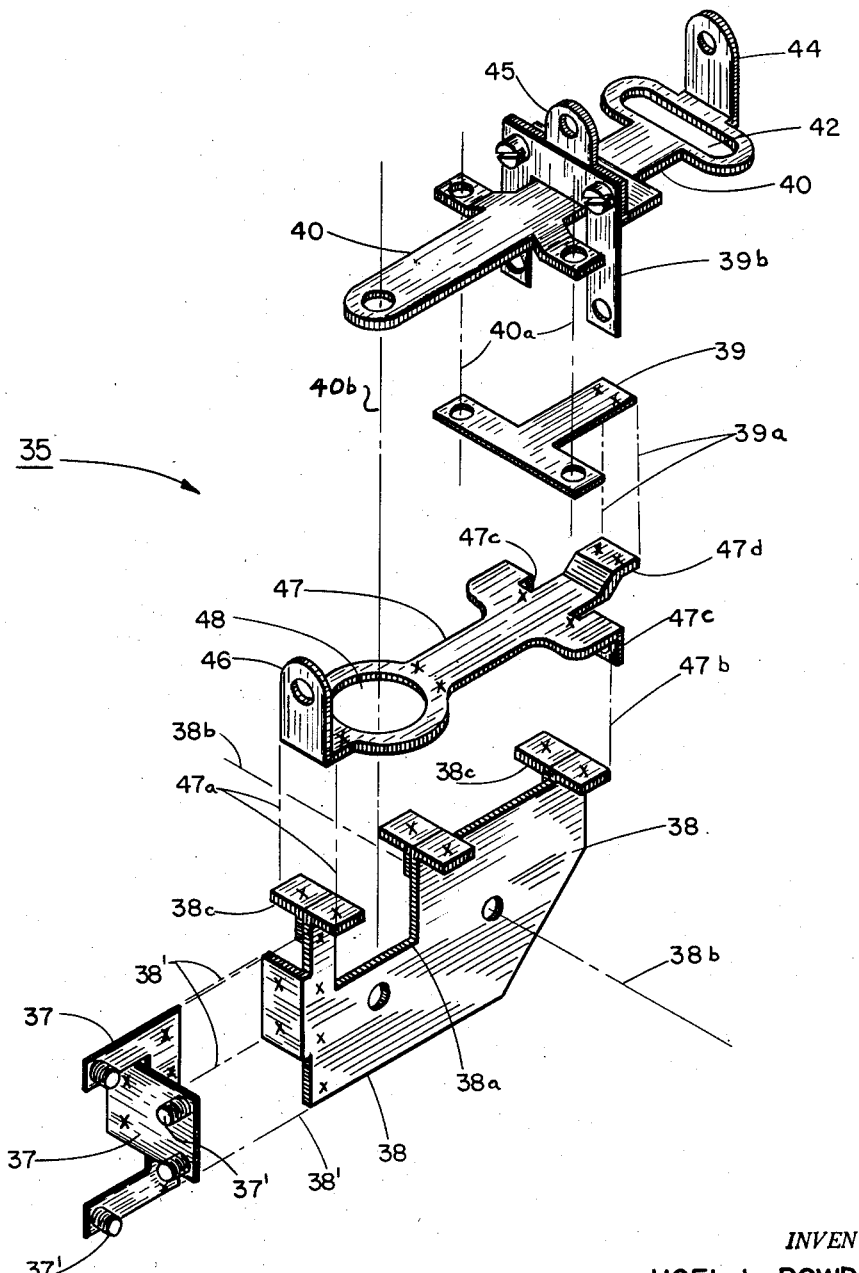
FIG. VI

# United States Patent Office 2,800,136
Patented July 23, 1957

VARIABLE RATIO APPARATUS

Hoel L. Bowditch, Foxboro, Mass., assignor to The Foxboro Company, Foxboro, Mass., a corporation of Massachusetts Application April 16, 1954, Serial No. 423,796

3 Claims. (Cl. 137—85)

This invention relates to apparatus for providing a predetermined ratio between values of variable conditions, and has particular reference to such apparatus wherein means is provided for varying such a ratio.

In many instances, in industrial processes for example, it is desirable to establish and maintain a particular ratio between variable conditions such as flow rate, liquid level, and the like. It is further desirable to be able to vary such a ratio according to the demands of varying process conditions. In modern large scale industrial processes errors of instrumentation result in substantial and expensive losses. Therefore any ratioing apparatus for such processes should provide fast, errorless response to variable condition changes and it becomes important to be able to quickly and accurately change the ratio relation in the apparatus.

This invention provides these features in an improved ratio apparatus. In the apparatus of this invention a pneumatic nozzle-baffle ratio device is provided with pneumatic means for varying the ratio relation in the apparatus. This invention accordingly provides means readily usable for varying the ratio relation in such apparatus from a remote location. Such remote control is important in many process systems with widespread installations.

It is, therefore, an object of this invention to provide an improved ratio apparatus, with means for pneumatically varying the ratio relation therein.

Other objects and advantages of this invention be in part apparent and in part pointed out hereinafter. The objects and advantages of this invention may be appreciated by reference to the accompanying drawings, which illustrate a preferred embodiment of the present invention, and wherein:

Figure I is a schematic, functional illustration of the general operation of apparatus embodying this invention;

Figure II is a plan view of a specific structure which operates generally according to the illustration of Figure I;

Figure III is a front elevation of the structure of Figure II, showing a cover thereon in vertical central section;

Figure IV is a right side elevation of the structure of Figure II, also with a showing of the cover;

Figure V is a left side elevation of the structure of Figure II, again with a showing of the cover; and Figure VI is an exploded perspective of a pivotable assembly which forms a substantial part of the structure of Figures II–V.

In the functionally illustrative Figure I, a baffle 10 is mounted on a pivot 11 for movement thereabout as indicated by the arrows 12. A pneumatic flow nozzle 15 is associated with the baffle 10 in such location and arrangement that pneumatic flow from the nozzle 15 is varied by restriction of the baffle 10 as the baffle is moved above its pivot 11. The baffle 10 is biased in both directions of this movement by springs 13 and 14. A primary bellows 16 is arranged to urge the baffle 10 toward the nozzle 15 in response to a primary signal of increased pneumatic pressure as applied to the primary bellows 16 through an input pipe 17. Opposing the primary bellows 16 is a secondary bellows 18 arranged to urge the baffle 10 away from the nozzle 15 in response to a secondary signal of increased pneumatic pressure. This secondary signal is applied to the secondary bellows 18 through a branch pipe 19 which is connected to a back pressure output pipe 20 communicating with the nozzle 15. When increased pressure in the primary bellows 16 causes the baffle 10 to move toward the nozzle 15, the consequence is that the restriction of the pneumatic flow from the nozzle is increased.

The nozzle 15 has a supply passage 21 connected thereto and the nozzle terminates in an outlet 22 to atmosphere in association with the baffle 10. The supply passage 21 has a restriction 23 therein. This restriction causes the nozzle pressure to be lower than the supply pressure when the nozzle outlet is open to atmosphere, because of the pressure drop of the air passing through it; and thus when the nozzle outlet is restricted, this pressure drop decreases and the nozzle output back pressure correspondingly increases.

The output passage 24 of the nozzle 15 is connected with the supply passage 21 between the restriction 23 and the outlet 22. Through the connection of the nozzle output passage 24 with the nozzle output pipe 20 by means of which the nozzle back pressure is applied to the secondary bellows 18, an output working pressure is also made available as indicated by the arrow 25.

Thus when the pressure in the primary bellows is increased, the nozzle flow is more restricted, the nozzle back pressure is increased in the nozzle output pipe 20, and the secondary bellows 18 has increased pressure applied thereto. Decreased pressure in the primary bellows 16 results in movement of the baffle 10 away from the nozzle 15, with consequent decrease in the restriction of the nozzle pneumatic flow and with the result that the pressure in the secondary bellows is decreased. Thus, the pressure in the secondary bellows 18 is a function of the degree of restriction of the pneumatic flow from the nozzle 15. In this structure, therefore, and with reference to the discussion of proportional control in the Philbrick Patent No. 2,360,889, issued October 24, 1944, a predetermined ratio is established between the pneumatic pressures in the primary and secondary bellows 16 and 18. The form and dimension characteristics of each of the primary and secondary bellows 16 and 18, plus their distance relations along the baffle 10 with respect to the baffle pivot 11, all go to establish predetermined moment relations between each of the bellows 16 and 18 aad the baffle 10.

In Figure I, further, the primary bellows 16 is indicated, by arrows 26, as being bodily movable along the baffle 10 toward and away from the pivot 11, to vary the moment relation of the primary bellows 16 with respect to the baffle 10. Such movement results in a change in the ratio between the primary signal pressure and the output, secondary pressure.

This ratio change is desirable under various conditions of operation of an industrial process. The primary bellows 16 is adjustably located along the baffle 10 in accordance with such desires by a ratio set bellows 27. A pneumatic ratio set signal applied to the ratio set bellows 27 results in the application of a ratio set force to the primary bellows supporting structure 28; and a bias spring 29 is provided in opposition to the ratio set bellows 27.

If desired, a differential ratio set bellows system may be used, that is, with the bias spring 29 replaced by a bellows, not shown. The differential of the pneumatic pressures of these opposing bellows will then comprise the ratio set signal. With the structure and arrangement of this invention, the ratio set signal, whether single or differential pressure, may be controlled from a distant point, and the ratio set signal may be automatically variable in accordance with a variable condition through the use of suitable control apparatus.

Figures II–IV are different views of a single structure, in a specific showing of a device embodying the main elements of and generally operable according to the functional showing of Figure I as discussed above. Certain portions of the structure of Figures II–VI have similar functions with respect to related portions of the showing of Figure I. These portions of Figures II–VI are indicated by the "primes" of the reference numbers used with the related portions of Figure I. In a brief general comparison of Figure I with the other figures, Figure III shows a baffle 10' with which a nozzle 15' and a secondary bellows 18' are associated. Figure IV shows a primary bellows 16' which operates through an arm 40 pivoted on a horizontal axis provided by cross flexures 39, 39b, to apply a primary force to the baffle 10, in opposition to a secondary force from the secondary bellows 18', Figure III. Figure II shows a transversely arranged ratio set bellows 27' with a loading spring 29' in opposition thereto. The ratio set bellows 27' operates to change, along the length of the baffle 10', the point of application of the primary force from the primary bellows 16', Figures IV and V, as applied through the arm 40. This change is accomplished by pivoting an entire assembly 35, the main body of which is shown in Figure VI. This assembly is pivoted about a vertical axis established by cross flexures 37, Figures II and VI, and the primary bellows 16' is a part of this assembly, as shown in Figures IV and V.

The structure of Figures II–V is mounted on a base 30 and, as shown in Figures III–V, this structure is contained in an inverted cup-like housing 31 which is also mounted on the base 30. As in Figure III the structure has a forward support block 32 on which, at the right side thereof, the nozzle 15' is fixedly mounted in an upwardly facing position. The baffle 10' is located above the nozzle 15' and is disposed horizontally in overlying relation with the nozzle outlet 22'. The baffle 10' is supported at its left end, Figure III, by a flexure 11' in the form of a flexible flat metal strip. The flexure 11' is mounted on the forward support block 32 and the baffle 10' is thus mounted for pivotal movement about the flexure 11' as a horizontal axis to allow movement of the baffle 10' in a vertical plane toward and away from the nozzle 15'. Such movement varies the degree of restriction of pneumatic flow from the nozzle outlet 22'. The baffle 10' extends to the right, Figure III, beyond the nozzle 15', and a bias spring 13' is secured to an extension 10" of this end of the baffle. The bias spring 13' is anchored to the structure base 30 with a tendency to pull the baffle 10' down against the nozzle 15'. In addition, the bias spring 13' is provided with a tension adjustment screw 13".

Laterally between the baffle flexure 11' and the nozzle 15', and beneath the baffle 10', the secondary bellows 18' is vertically mounted on the forward support block 32. The lower end of the secondary bellows 18' is fixed on the block 32 and the upper end of the bellows 18' engages the underside of the baffle 10' and tends to move the baffle 10' about the flexure 11' as a pivot in accordance with varying pressures within the bellows 18'. Increased pressure in the secondary bellows 18' tends to move the baffle 10' upwards and away from the nozzle 15' against the biasing action of the spring 13'. The pneumatic passages and connections of the nozzle supply and output, of the nozzle itself, and of the secondary bellows, as shown in Figure I, are provided within the forward support block 32 of Figures II–V. In Figure III, on the block 32, openings 21' and 20' are shown as nozzle supply and output openings respectively.

For consideration of supporting and operating structure associated with the primary bellows 16', reference is made particularly to Figures IV and VI. As in Figure IV, the primary bellows 16' is mounted on the primary bellows assembly 35. At the right in Figure IV a vertical mounting post 36 is provided for the support of the primary bellows assembly 35, and a support connection between the assembly 35 and the post 36 is provided in the form of cross flexures 37, see also Figure VI.

These flexures provide a vertical axis about which the assembly 35 may be pivoted. The assembly 35 is thus pivoted for ratio set movement along the baffle 10' toward and away from the baffle pivot 11'. In this manner variations are provided in the distance from the baffle pivot 11' to the point on the baffle 10' at which a force from the primary bellows 16' is applied.

Figure VI shows the main portions of the primary bellows assembly 35. When assembled, some of these portions are spot welded together, and the remaining portions are bolted together. At the bottom left, the cross flexures 37 are shown in their assembled relation to each other, with bolts 37' therein as the means for attaching the cross flexures 37 to the support post 36 of Figures II, IV and V. The cross flexures 37 are also attached to a first arm 38 which is in the form of a vertically disposed plate. This attachment may be accomplished by spot welding as indicated (Figure VI) by X marks on the flexures and on the arm 38, with these bodies being assembled as generally indicated by the guide lines 38'.

The arm 38 has therein a vertically disposed U slot 38a which is open on the top edge of the arm 38, for receiving the primary bellows 16' in vertical disposition therewithin. A transverse axis 38b is shown as an indication of the location of the longitudinal axis of (Figure II) the ratio set bellows 27' and the opposing spring 29' therefor. This ratio set bellows and spring arrangement has points of similarity with respect to the Figure I arrangement of the ratio set bellows 27 and its opposing spring 29.

The arm 38 is also provided with top angled portions 38c which provide horizontal surfaces along the top of the arm and to which an assembly member 47 is fixed, as indicated by the spot weld X marks and guide lines 47a and 47b. The member 47 is formed with an upright bracket 46 at one end; an opening 48 through which the primary bellows 16' extends; a pair of depending ears 47c at the other end of the member 47 and assembled with the arm 38 as indicated by guide line 47b; and an upwardly stepped end portion 47d between the ears 47c, to which a horizontally disposed T-shaped flexure 39 is secured as indicated by spot weld X marks and guide lines 39a.

In the assembly 35, a second arm 40 is provided, along and above the first arm 38 and the assembly member 47. The second arm 40 is pivotally mounted with respect to the first arm 38 on a cross flexure arrangement, with the flexure 39 as a part of this arrangement. The second flexure, 39b, is in the form of a vertically disposed, inverted U which straddles the second arm 40 with the base of the U flexure secured to an upright bracket portion 45 of the arm 40. The depending legs of the U flexure 39b are secured to the depending ears 47c of the assembly member 47. The flexure 39 is secured to the arm 40 as indicated by guide lines 40a. Thus the second arm 40 is pivotally mounted with respect to the first arm 38 about a horizontal axis provided by a cross flexure arrangement of the flexures 39 and 39b, with this cross flexure arrangement mounted on the assembly member 47.

One end of the second arm 40 overlies the opening 48, in the member 47 and the slot 38a in the first arm 38 in vertical alignment as indicated by guide line 40b. Accordingly as in Figures IV and V, the primary bellows 16' engages the underside of one end of the second arm 40. When the pneumatic pressure in the bellows 16' is increased, there is a tendency to move the arm 40 about its cross flexure pivot mounting 39, 39b. As in Figures II–V the other, or front end of the second arm 40 transversely overlies the horizontal baffle 10' and supports a baffle engaging wheel 41. The baffle engaging wheel lies for the most part above the second arm 40. A portion of the wheel extends downward through an opening 42, Figures II and VI, in the second arm 40, and into engagement with the top of the baffle 10'. The wheel 41 is mounted for rotation with a horizontal shaft 43 Figures II, IV, and V which is disposed above and parallel with the second arm 40. The wheel shaft 43 is journaled in upright brackets 44 and 45 on the arm 40. The wheel 41 is thus movable with a rolling action along the top and length of the baffle 10' in accordance with the movement of the whole primary bellows assembly 35 about its vertical axis cross flexure 37.

As in Figures II, IV, and V the wheel shaft bracket 45 extends above the wheel shaft 43 and provides a forward anchor for a horizontally disposed, primary bellows loading spring 14'. The spring 14' has a rear anchor in the upright bracket (46) portion of the primary bellows assembly member 47. The spring 14' thus serves to apply a biasing force to the bracket 45 tending to rotate this bracket about the cross-flexure 39, 39b in such a direction as to reduce the contact pressure between the wheel 41 and the baffle 10'. The spring 14' is also provided with a tension adjustment screw 49 in the rear bracket 46.

In this structure, therefore, the pressure in the primary bellows 16' provides a force which is transmitted to the baffle 10' through the second arm 40 and the baffle engaging wheel 41. The primary bellows 16' is provided with a pneumatic signal supply pipe 17' which is arranged, as in Figure II, in flexible coil form so that the primary bellows 16' may be moved laterally as the primary bellows assembly 35 is pivoted about the vertical axis provided by the cross flexure 37. In Figure IV an opening 17" is shown as the inlet to pipe 17'.

Thus the primary and secondary bellows 16' and 18' are arranged and constructed to provide a particular ratio between the primary and secondary pneumatic pressure values, and to develop opposing moments with the baffle 10, in relation to the baffle pivot 11'. The moment arm length of the primary assembly 35 as a whole about the cross flexure 37 as a pivot. The second arm 40 thus moves horizontally, and in consequence the wheel 41 moves along the baffle 10' to change the distance between the wheel 41 and the baffle pivot 11'. The pressure in the primary bellows 16' thereafter results in the application of the primary force to a different point on the baffle 10' to develop the same moment therewith, but with a different force-moment arm relation. A new ratio relation is accordingly established between the primary and secondary pneumatic pressures.

Figure II shows the structure and arrangements for changing the pneumatic pressure ratio relation by moving the primary bellows assembly 35 horizontally about the cross flexure 37 as a pivot. On the left side of the structure the ratio set bellows 27' is horizontally disposed in a direction transversely of the primary bellows assembly 35, see Figure VI, axis 38b. The outer, or Figure II left end of the ratio set bellows 27' is fixed, and the inner end thereof is movable in accordance with varying pressures within the bellows 27'. The inner end of the ratio set bellows 27' is in engagement with the first arm 38 of the primary bellows assembly 35. In Figure V an opening 27" is shown as an inlet to the ratio set bellows 27'. In opposition to the ratio set bellows 27' a coil spring 29' (Figure II) is mounted on the right side of the structure. The spring 29' has similarities of function with respect to the ratio set spring 29 of Figure I, that is, it is the usual loading spring which is commonly applied to a bellows in this type of application.

This invention, therefore, provides pneumatic control apparatus wherein a first pneumatic pressure controls a second pneumatic pressure in a predetermined ratio relation therewith, and wherein means is provided for varying this ratio in response to changes in a third pneumatic pressure.

As many embodiments may be made of the above invention, and as changes may be made in the embodiments set forth above, without departing from the scope of the invention, it is to be understood that all mater hereinbefore set forth or shown in the accompanying drawings is to be interpreted as illustrative only and not in a limiting sense.

I claim:

1. Ratio apparatus for producing a pneumatic output signal the magnitude of which is proportional to the magnitude of a first input signal, and wherein the proportionality between said output signal and said first input signal is variable in accordance with the magnitude of a second input signal, comprising, in combination, an elongated force bar rotatably held by a first pivotal support at one end thereof, a first pressure-responsive device associated with said force bar to produce a first torque thereon about said first pivotal support in accordance with the pressure fed to said device, an arm unit extending generally perpendicularly to the longitudinal axis of said force bar and having an element integral therewith extending out over and in contact with said bar, second pivotal support means for rotatably mounting said element on said arm unit, a second pressure-responsive device mounted on said arm unit and movable therewith, said second device being arranged to apply a force to said element to tend to rotate said element about said second pivotal support and to urge said element against said force bar in such a manner as to produce a second torque on said force bar about the pivot axis thereof, said second torque being in opposition to said first torque, third pivotal support means for rotatably holding said arm unit at the end thereof remote from said force bar to permit said arm unit to move in such a manner that said element travels generally along the longitudinal axis of said force bar and thereby varies the point of contact between said element and said bar, a third pressure-responsive device associated with said arm unit and adapted to move said arm unit about said third pivotal support to fix the point of contact between said element and said bar in accordance with the magnitude of the pressure fed to said third device, a nozzle associated with the movable end of said force bar and supplied through a flow restrictor with gas under pressure, said bar being arranged to control the rate of gas flow through said nozzle in accordance with the positioning thereof about said first pivotal support, conduit means for coupling said nozzle to said first pressure-responsive device to cause the magnitude of said first torque to be determined by the positioning of said bar with respect to said nozzle and in such a manner that the total torques on said bar are maintained in balance automatically, means for supplying a first pneumatic pressure input signal to said second pressure-responsive device to produce a pressure in said nozzle proportional to said first input signal, means for supplying a second pneumatic pressure input signal to said third pressure-responsive device to set the point of contact between said element and said bar in accordance therewith and thereby to establish the desired proportionality between said first input signal and the pressure in said nozzle, and means to couple a pneumatic pressure output signal from said nozzle.

2. Ratio apparatus for producing a pneumatic output signal the magnitude of which is proportional to the magnitude of a first input signal, and wherein the proportionality between said output signal and said first input signal is variable in accordance with the magnitude of a second input signal, comprising, in combination, an elongated force bar rotatably held by a first pivotal support at one end thereof, a first pressure-responsive device associated with said force bar to produce a first torque thereon about said first pivotal support in accordance with the pressure fed to said device, an arm unit extending generally perpendicularly to the longitudinal axis of said force bar, a shaft mounted on said arm unit and extending out over said bar, a wheel secured to said shaft and positioned in such a manner that its periphery is in contact with one side surface of said bar, second pivotal support means for mounting said shaft on said arm unit, a second pressure-responsive device mounted on said arm unit and movable therewith, said second device being arranged to apply a force to said wheel shaft to tend to move said shaft about said second pivotal support and thereby to urge said wheel against said force bar in such a manner as to produce a second torque on said force bar about the pivot axis thereof, said second torque being in opposition to said first torque, third pivotal support means for rotatably holding said arm unit at the end thereof remote from said force bar to permit said arm unit to move in such a manner that said wheel travels with a rolling movement generally along the longitudinal axis of said force bar and thereby varies the point of contact between the periphery of said wheel and said bar, a third pressure-responsive device associated with said arm unit and adapted to move said arm unit about said third pivotal support to fix the point of contact between said wheel and said bar in accordance with the magnitude of the pressure fed to said third device, a nozzle associated with the movable end of said force bar and supplied through a flow restrictor with gas under pressure, said bar being arranged to control the rate of gas flow through said nozzle in accordance with the positioning thereof about said first pivotal support, conduit means for coupling said nozzle to said first pressure-responsive device to cause the magnitude of said first torque to be determined by the positioning of said bar with respect to said nozzle and in such a manner that the total torques on said bar are maintained in balance automatically, means for supplying a first pneumatic pressure input signal to said second pressure-responsive device to automatically produce a pressure in said nozzle proportional to said first input signal, means for supplying a second pneumatic pressure input signal to said third pressure-responsive device to set the point of contact between said wheel and said bar in accordance therewith and thereby to establish the desired proportionality between said first input signal and the pressure in said nozzle, and means to couple a pneumatic pressure output signal from said nozzle.

3. Ratio apparatus for producing a pneumatic output signal the magnitude of which is proportional to the magnitude of a first input signal, and wherein the proportionality between said output signal and said first input signal is variable in accordance with the magnitude of a second input signal, comprising, in combination, an elongated force bar rotatably held by a first pivotal support comprising a cross-flexure mounting at one end thereof, a first pressure-responsive device associated with said force bar to produce a first torque thereon about said first pivotal support in accordance with the pressure fed to said device, first adjustable biasing spring means secured to said force bar to counter said first torque, an arm unit extending generally perpendicularly to the longitudinal axis of said force bar, a shaft mounted on said arm unit and extending out over said bar, a wheel secured to said shaft and positioned in such a manner that its periphery is in contact with one side surface of said bar, second pivotal support means comprising a cross-flexure for mounting said shaft on said arm unit, a second pressure-responsive device mounted on said arm unit and movable therewith, said second device being arranged to apply a force to said wheel shaft to tend to move said shaft about said second pivotal support and thereby to urge said wheel against said force bar in such a manner as to produce a second torque on said force bar about the pivot axis thereof, said second torque being in opposition to said first torque, second adjustable biasing spring means arranged to counter the force exerted on said wheel shaft by said second pressure-responsive device, third pivotal support means comprising a cross-flexure mounting for rotatably holding said arm unit at the end thereof remote from said force bar to permit said arm unit to move in such a manner that said wheel travels with a rolling movement generally along the longitudinal axis of said force bar and thereby varies the point of contact between the periphery of said wheel and said bar, a third pressure-responsive device associated with said arm unit and adapted to move said arm unit about said third pivotal support to fix the point of contact between said wheel and said bar in accordance with the magnitude of the pressure fed to said third device, third biasing spring means arranged to counter the force exerted on said arm unit by said third device, a nozzle associated with the movable end of said force bar and supplied through a flow restrictor with gas under pressure, said bar being arranged to control the rate of gas flow through said nozzle in accordance with the positioning thereof about said first pivotal support, conduit means for coupling said nozzle to said first pressure-responsive device to cause the magnitude of said first torque to be determined by the positioning of said bar with respect to said nozzle and in such a manner that the total torques on said bar are maintained in balance automatically, means for supplying a first pneumatic pressure input signal to said second pressure-responsive device to automatically produce a pressure in said nozzle proportional to said first input signal, means for supplying a second pneumatic pressure input signal to said third pressure-responsive device to set the point of contact between said wheel and said bar in accordance therewith and thereby to establish the desired proportionality between said first input signal and the pressure in said nozzle, and means to couple a pneumatic pressure output signal from said nozzle.

References Cited in the file of this patent

UNITED STATES PATENTS

| | | |
|---|---|---|
| 2,409,871 | Krogh | Oct. 22, 1946 |
| 2,521,477 | Pellettere | Sept. 5, 1950 |
| 2,672,151 | Newbold | Mar. 16, 1954 |